May 10, 1932. G. T. COOKE 1,858,039
LOCK FOR CASTELLATED NUTS
Filed July 24, 1931

INVENTOR,
George T. Cooke
BY
Mitchell & Bechert
ATTORNEYS

Patented May 10, 1932

1,858,039

UNITED STATES PATENT OFFICE

GEORGE T. COOKE, OF SOUTH NORWALK, CONNECTICUT

LOCK FOR CASTELLATED NUTS

Application filed July 24, 1931. Serial No. 552,842.

My invention relates to certain new and useful improvements in nuts and bolts, the nut being of the so-called "castellated" type. The invention consists in a novel means for automatically locking the nut in adjusted position on the bolt.

The main object is to provide means whereby a nut of the ordinary castellated type may be securely locked in its adjusted position by the mere act of driving a cotter pin into place, the ends thereof being automatically opened or spread as the pin is "driven home".

In the accompanying drawings I have shown my invention in its preferred form only. I am aware that various changes may be made in the structure without avoiding the invention or the scope of the appended claims.

In the drawings—

Figure 1:
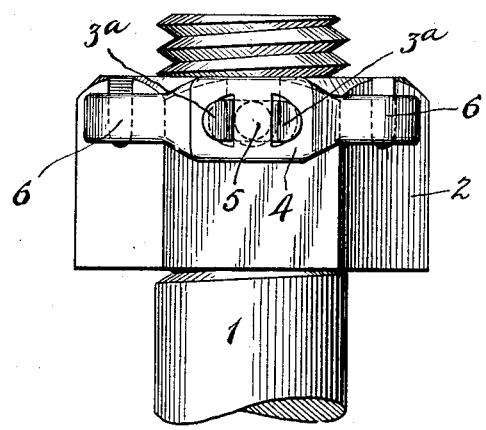
Fig. 1 is a side view of a bolt and a nut of the ordinary type, together with the means that embodies my invention.
Figure 2:
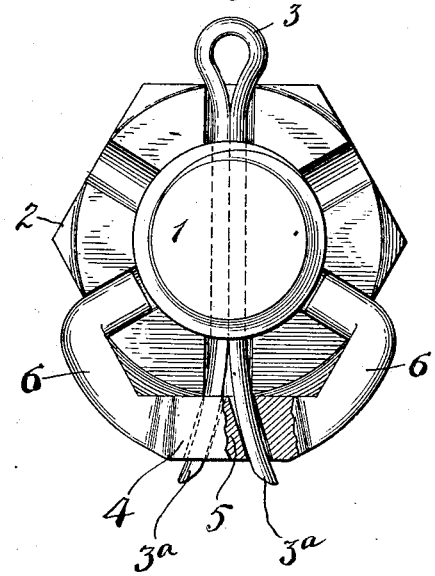
Fig. 2 is a view of the outer end thereof.

1 represents a screw threaded pin or bolt having the usual cotter pin passage or passages. 2 represents an ordinary "castellated" nut. 3 represents the head of a cotter pin. 3a—3a represent the ends of said cotter pin. 4 represents what I may term a block for automatically spreading the cotter pin ends to lock the nut against turning after the same has been adjusted to the desired position on said pin or bolt. This block 4 has two divergent passages each of which is preferably semi-circular in cross-section. These passages form between them a wedge 5 the apex of which faces the bolt in line with the notch or recess in the nut between the castellation thereon when the clock is in operative position. To hold the block 4 in the operative position, I provide two hook-like devices 6—6 at the opposite ends of said block, said hooks being so proportioned and bent that the ends thereof will incline toward each other and extend into two notches or recesses at opposite sides of the notch in front of the wedge 5. Since these two notches radiate from the center of the nut, they are pitched at an angle to each other, and hence when the inturned ends of the hooks 6—6 extend into these notches they will hold the block 4 firmly in operative position in front of one of the flat faces of the nut. When the nut has been adjusted to the desired position on the pin or bolt 1, the cotter pin is applied by being entered through the notch or recess in the nut on the opposite side of said pin or bolt from the wedge 5. By driving the cotter pin inwardly, the two ends 3a—3a engage the wedge 5 and will be spread apart, as shown in Fig. 2. When the cotter pin has been "driven home", it will not only be held in place itself against unintentional dislodgement, but it will positively hold the nut against shifting on the pin or bolt. As shown by both the solid and dotted lines in Fig. 2, the opposite sides of the cotter pin bear firmly against the bolt, nut, and block at a plurality of points so that displacement of the nut on said bolt is prevented. For example, when the cotter pin is driven fully in, it will engage the opposite walls of the recess in the nut through which the pin is entered. Its spread ends will engage the opposite walls of the cotter pin passage in the bolt 1, the opposite walls of the notch adjacent to the wedge 5, and the opposite walls of the wedge. In practice I prefer to pitch the opposite walls of the wedge 5 at an angle of about eighteen (18°) degrees. By this construction, the block may be applied to the nut quickly and easily at any side with the block facing any one of the flattened surfaces thereof so that the wedge 5 may be caused to face the cotter pin passage in the pin or bolt. When the cotter pin is in place it not only holds the nut securely in adjusted position, but also holds the block from tilting and from removal. By the use of this means for locking castellated nuts, an inspector may observe instantly and plainly whether the nut is locked, inasmuch as the mere presence of the block 4 tells the story.

I claim:

1. A locking device for a castellated nut comprising, a block having passages therethrough forming between them a wedge, and means for rigidly holding said block against the side of such a nut with the apex of said wedge facing a notch therein, said holding means comprising a rigid hook at each end of said block, the ends of said hooks being inturned toward each other to hook into the two notches on opposite sides of the first mentioned notch, to embrace that portion of said nut between said two notches.

2. A locking device for a nut having a plurality of radially arranged notches in the end thereof around the central bolt passage therein to form a "castellated" end, comprising a rigid block having passages therein forming a wedge therebetween with its apex at the inner side to face the end of one of said notches at the side of said nut, and two rigid hooks at the ends of said block, positioned to enter the two notches at the opposite sides of the first mentioned notch to rigidly hold the block at the side of the nut against inside strain applied thereto.

GEORGE T. COOKE.